(12) United States Patent
Lee et al.

(10) Patent No.: US 12,242,154 B2
(45) Date of Patent: Mar. 4, 2025

(54) DISPLAY DEVICE

(71) Applicant: LG Display Co., Ltd., Seoul (KR)

(72) Inventors: Yongseok Lee, Paju-si (KR); Hyukjoon Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/498,412

(22) Filed: Oct. 31, 2023

(65) Prior Publication Data

US 2024/0168333 A1 May 23, 2024

(30) Foreign Application Priority Data

Nov. 17, 2022 (KR) .......................... 10-2022-0154656

(51) Int. Cl.
*G02F 1/1335* (2006.01)

(52) U.S. Cl.
CPC .... *G02F 1/133607* (2021.01); *G02F 2203/03* (2013.01)

(58) Field of Classification Search
None
See application file for complete search history.

(56) References Cited

U.S. PATENT DOCUMENTS

2023/0080781 A1* 3/2023 Zheng ..................... G02F 1/292
359/315
2023/0258972 A1* 8/2023 Park ...................... G02F 1/1323
349/56

FOREIGN PATENT DOCUMENTS

KR 10-2021-0141842 A 11/2021

* cited by examiner

*Primary Examiner* — Phu Vu
(74) *Attorney, Agent, or Firm* — Fenwick & West LLP

(57) ABSTRACT

Embodiments relate to a display device including: a display panel configured to display an image; a backlight unit below the display panel, the blacklight unit configured to emit light; and an optical path control member interposed between the display panel and the backlight unit. The optical path control member includes a first electrode, a second electrode, and a light conversion layer interposed between the first electrode and the second electrode. The light conversion layer includes: a partition portion; and receiving portions which are formed in a pyramid shape within the partition portion and in which scattered particles are dispersed.

23 Claims, 7 Drawing Sheets

(a)  (b)

DISPLAY DEVICE

CROSS REFERENCE TO RELATED APPLICATION

The present application claims priority to Republic of Korea Patent Application No. 10-2022-0154656, filed on Nov. 17, 2022, the entire contents of which are incorporated herein for by reference in their entirety.

TECHNICAL FIELD

The present disclosure relates to a display device and more particularly, for example, without limitation, to a display device including light conversion layer.

BACKGROUND

Liquid crystal display devices are a widely used form of display technology. In a liquid crystal display device, liquid crystals are injected between two glass substrates, a voltage is applied to electrodes through power sources disposed over and under the glass substrates, and light is emitted from an external source and through the liquid crystals by altering an arrangement of the liquid crystals, so as to display information.

As liquid crystal display devices become larger in size, a visual difference between viewing the central portion of a screen and viewing both left and right ends of the screen increases. Therefore, research is being conducted to reduce the visual difference. Recently, in order to overcome the visual difference, a method has been proposed, which curves the screen of the liquid crystal display device with respect to the central portion. A liquid crystal display device to which a so-called curved panel is applied is being used.

The description provided in the description of the related art section should not be assumed to be prior art merely because it is mentioned in or associated with the description of the related art section. The description of the related art section may include information that describes one or more aspects of the subject technology, and the description in this section does not limit the invention.

SUMMARY

As recognized by the inventors, since the curved display device is manufactured by curving a flat panel with an external force and is controlled to consume high power in order to improve luminance, it has damage and power consumption problems and has reliability deterioration under the circumstances of high temperature/high humidity/thermal shock, etc. Accordingly, an object of the present disclosure is to provide a display device capable of controlling a viewing angle without curving a panel.

Also, another object of the present disclosure is to provide a display device capable of controlling front light emission or directional light emission according to modes.

One exemplary embodiment is a display device that may include: a display panel configured to display an image; a backlight unit configured to be disposed below the display panel and to emit light; and an optical path control member configured to be interposed between the display panel and the backlight unit and to include a first electrode, a second electrode, and a light conversion layer interposed between the first electrode and the second electrode.

The light conversion layer may include: a partition portion; and receiving portions which are formed in a pyramid shape within the partition portion and in which scattered particles are dispersed.

The receiving portions may be formed in a symmetrical pyramid shape in a central portion of the optical path control member and are formed in an asymmetrical pyramid shape in an edge portion of the optical path control member.

The receiving portions may be formed in a triangular pyramid shape within the partition portion.

The optical path control member may comprise three or more regions aligned from one side to the other side of the optical path control member, each region having at least one receiving portion, and the receiving portion of the first region are mirrored on the receiving portion of the last region.

A degree of asymmetry of each receiving portion may gradually increase from the central portion to the edge portion.

In a first mode, when a voltage is not applied to the first electrode and the second electrode, the scattered particles may be dispersed within the receiving portions. The light generated by the backlight unit may be scattered by the scattered particles and may be emitted to a front of the display panel.

In a second mode, when a voltage is applied to the first electrode and the second electrode, the scattered particles may be aggregated around the first electrode or the second electrode. The light generated by the backlight unit may be refracted at an interface between the receiving portion and the partition portion and may be emitted toward a central portion of the display panel.

The receiving portions may have a refractive index smaller than that of the partition portion.

Each of the receiving portions may include: a first sidewall which is adjacent to one side of the optical path control member; and a second sidewall which is adjacent to the other side of the optical path control member.

The closer to the one side, the more the inclinations of the first sidewalls of the receiving portions may gradually increase. The closer to the other side, the more the inclinations of the second sidewalls of the receiving portions may gradually increase.

The optical path control member may include first to fifth regions aligned from the one side to the other side. Angles formed by the first and second sidewalls and the first electrode may be different in the first to fifth regions.

In the third region, the angle formed by the first sidewall of the receiving portions and the first electrode may be the same as the angle formed by the second sidewall and the first electrode.

The angle formed by the first sidewall of the receiving portions and the first electrode in the second region may be smaller than the angle formed by the first sidewall of the receiving portions and the first electrode in the third region.

The angle formed by the first sidewall of the receiving portions and the first electrode in the first region may be smaller than the angle formed by the first sidewall of the receiving portions and the first electrode in the second region.

The angle formed by the second sidewall of the receiving portions and the first electrode in the fourth region may be smaller than the angle formed by the second sidewall of the receiving portions and the first electrode in the third region.

The angle formed by the second sidewall of the receiving portions and the first electrode in the fifth region may be smaller than the angle formed by the second sidewall and the first electrode in the fourth region.

The receiving portions of the second region may be mirrored on the receiving portions of the fourth region. The receiving portions of the first region may be mirrored on the receiving portions of the fifth region.

Another embodiment is a display device that may include: a display panel configured to display an image; a backlight unit configured to be disposed below the display panel and to emit light; and an optical path control member configured to be interposed between the display panel and the backlight unit and to control a path of light generated by the backlight unit.

The optical path control member may emit the light generated by the backlight unit to a front of the display panel in a first mode, and may emit the light generated by the backlight unit to a specific area of the display panel in a second mode.

The specific area may be a central portion of the display panel.

The optical path control member may include: a first electrode which is disposed on the backlight unit; a second electrode which is disposed below the display panel; and a light conversion layer which is interposed between the first electrode and the second electrode and includes receiving portions formed within a partition portion in a pyramid shape.

The receiving portions may be formed in a triangular pyramid shape within the partition portion.

The light conversion layer may comprise three or more regions aligned from one side to the other side of the light conversion layer, each region having at least one receiving portion, and the receiving portion of the first region are mirrored on the receiving portion of the last region.

The receiving portions may be formed in a symmetrical pyramid shape in a central portion of the light conversion layer and are formed in an asymmetrical pyramid shape in an edge portion of the light conversion layer.

Each of the receiving portions may include: a dispersion liquid; and scattered particles which are dispersed in the dispersion liquid and scatter incident light.

An inclination of one side wall of pyramid shaped e receiving portion may gradually increase from a central portion to an edge portion of the optical path control member. An inclination of the pyramid shape of the receiving portions may gradually increase from a central portion to an edge portion of the optical path control member.

An inclination of another side wall of the pyramid shaped receiving portion may gradually decrease from the central portion to the edge portion of the optical path control member.

Other details of the exemplary embodiments are included in the detailed description and the drawings.

The display device according to the embodiments of the present disclosure can support the directional light emission for a viewer located in the center of the screen without curving the display panel, thereby providing the same effect as that of a curved display device.

In addition, the display device according to the embodiments of the present disclosure provides the same effect as that of the curved display device by using a flat panel display panel, thereby preventing the deterioration of environmental reliability and damage of the display panel due to the curving of the display panel.

In addition, the display device according to the embodiments of the present disclosure can solve the power consumption problem of the curved display device and enhance the luminance.

It is to be understood that in addition to the effects of the present disclosure as mentioned above, additional advantages and features of the present disclosure will be clearly understood by those skilled in the art from the above description of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

Figure 1:
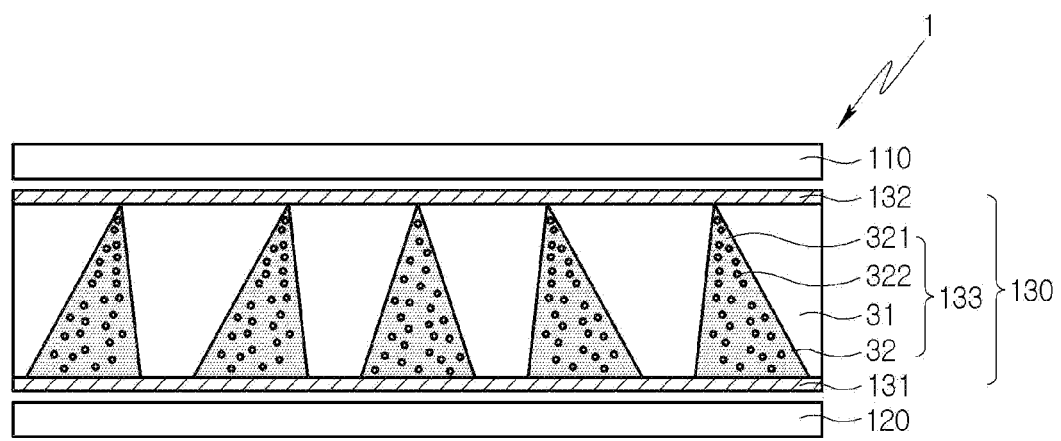
FIG. 1 is a cross-sectional view of a display device according to an exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Hereinafter, embodiments of the present disclosure will be described with reference to the accompanying drawings. In this specification, when it is mentioned that a component (or region, layer, portion) "is on", "is connected to", or "is combined with" another component, terms "is on", "connected to", or "combined with" mean that a component may be directly connected to/combined with another component or mean that a third component may be disposed between them.

The shapes, sizes, areas, ratios, angles, numbers, and the like illustrated in the accompanying drawings for describing various embodiments of the present disclosure may be merely examples, and the present disclosure is not limited thereto. Like reference numerals generally denote like elements throughout the specification. Further, in the following description of the present disclosure, a detailed description of known related technologies may be omitted or may be briefly provided to avoid unnecessarily obscuring the subject matter of the present disclosure.

The terms such as "include," "have," "comprise," "contain," "constitute," "make up of," "formed of," and "consist of" used herein are generally intended to allow other elements to be added unless the terms are used with the term such as "only". Any references to singular may include plural unless expressly stated otherwise.

Elements are interpreted to include an ordinary error range or an ordinary tolerance range even if not expressly stated.

When the position relation between two parts is described using the terms such as "on", "above", "over", "below", "under", "beside", "beneath", "near", "close to," "adjacent to", "on a side of", "next" or the like, one or more parts may be positioned between the two parts unless the terms are used with the term such as "immediately" or "directly".

Spatially relative terms, such as "under," "below," "beneath", "lower," "over," "upper" and the like, may be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

In describing temporal relationship, terms such as "after," "subsequent to," "following," "next," "before," and the like may include cases where any two events are not consecutive, unless the term such as "immediately" "just" or "directly" is explicitly used.

In the drawings, the thicknesses, ratios, and dimensions of the components are exaggerated for effective description of the technical details. A term "and/or" includes all of one or more combinations that related configurations can define.

While terms such as "first" and, "second", "A", "B", "(a)", "(b)" or the like, can be used to describe various components, the components are not limited by the terms mentioned above. The terms are used only for distinguishing between one component and other components. For example, the first component may be designated as the second component without departing from the scope of rights of various embodiments. Similarly, the second component may be designated as the first component. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof described in the specification, and intended not to previously exclude the possibility of existence or addition of at least one other characteristics, numbers, steps, operations, components, parts or any combination thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A term "device" used herein may refer to a display device including a display panel and a driver for driving the display panel. Examples of the display device may include a liquid crystal display (LCD), and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including LCD and the like, but embodiments of the present disclosure are not limited thereto.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

When reference numerals are given to elements of drawings describing the embodiments of the present disclosure, the same elements are designated by the same reference numerals as much as possible even though they are shown in different drawings.

Figure 2:
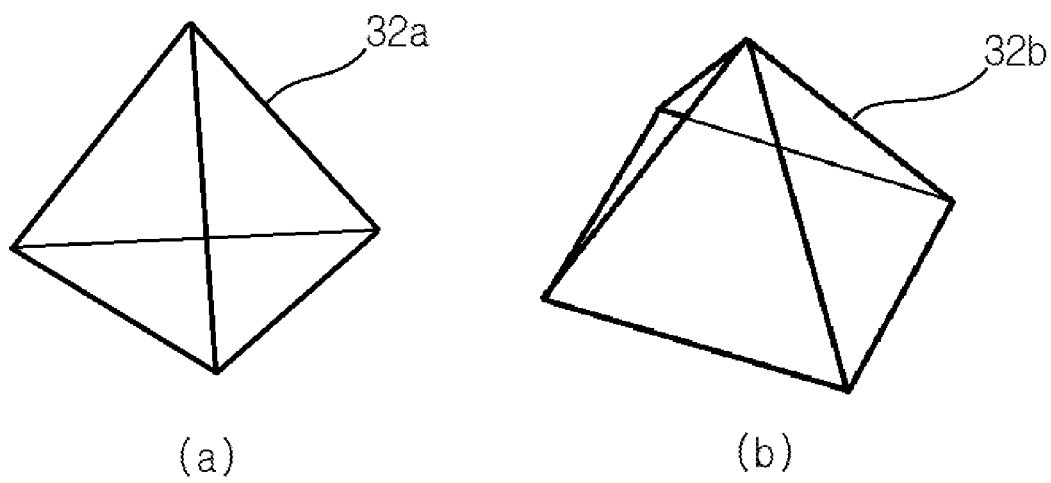
FIG. 2 is shows various shapes of a receiving portion of the present disclosure.
Figure 3:
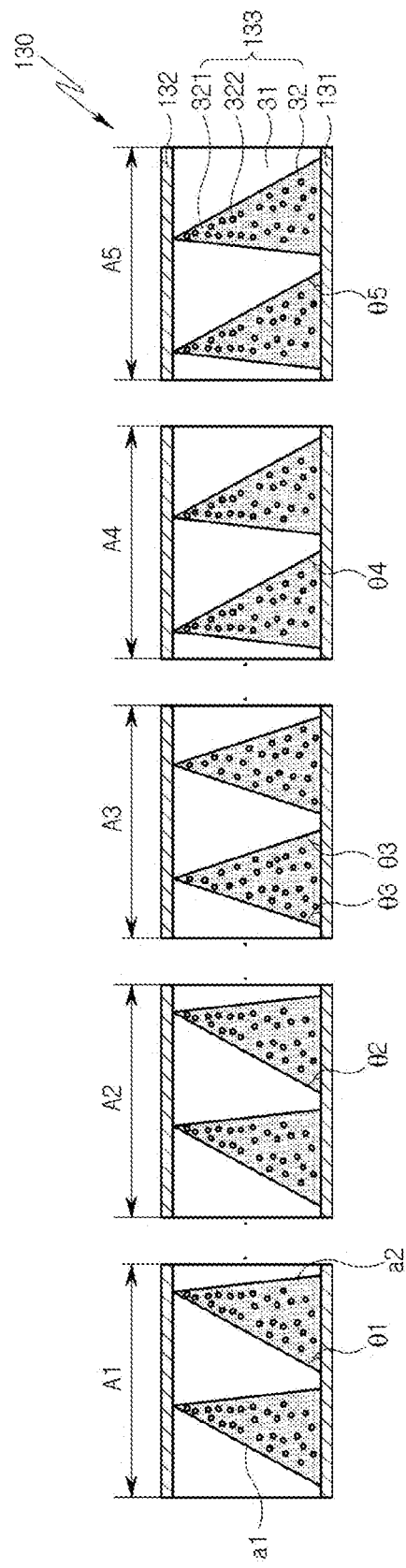
FIG. 3 is a cross-sectional view showing a shape of a receiver in each region of an optical path control member according to an embodiment of the present disclosure.

FIG. 1 is a cross-sectional view of a display device according to an exemplary embodiment of the present disclosure. FIG. 2 is shows various shapes of a receiving portion of the present disclosure. FIG. 3 is a cross-sectional view showing a shape of a receiver in each region of an optical path control member according to an exemplary embodiment of the present disclosure. All the components of each display device according to all embodiments of the present disclosure are operatively coupled and configured.

Referring to FIG. 1, a display device 1 according to an exemplary embodiment of the present disclosure may include a display panel 110 that includes pixels and displays an image, and a backlight unit 120 that is disposed on a rear surface of the display panel 110 and emits light to the front of the display panel 110. Although not shown, the display device 1 may further include a panel guide, a top case, and a bottom cover which receives and fixes the display panel 110 and the backlight unit 120.

The display panel 110 is a liquid crystal panel and may include a lower substrate and an upper substrate bonded together to face each other, and a liquid crystal layer interposed between the substrates.

The lower substrate may include gate lines and data lines arranged to intersect each other, and liquid crystal cells formed at intersections of the gate lines and the data lines. In the present embodiment, the liquid crystal cells may be arranged in a matrix form on the lower substrate. The liquid crystal cells may include a thin film transistor disposed at intersections of the gate lines and the data lines, and a pixel electrode that receives a data voltage applied to the data line through the thin film transistor when the thin film transistor is turned on.

Color filters for realizing a plurality of colors including red, green, and blue, a black matrix for partitioning between the color filters and blocking light that passes through the liquid crystal layer, and a common electrode for applying a voltage to the liquid crystal layer may be formed on the upper substrate.

The common electrode may be formed on the upper substrate in a vertical electric field driving method such as a twisted nematic (TN) mode and a vertical alignment (VA) mode, and may be formed together with the pixel electrode on the lower substrate in a horizontal electric field driving method such as an in-plane switching (IPS) mode and a fringe field switching (FFS) mode.

The liquid crystal cells are driven according to an electric field generated by an electric potential difference between the data voltage supplied to the pixel electrode through the data lines and a common voltage supplied to the common electrode and control the amount of light transmitted through the display panel 110.

The backlight unit 120 is disposed below the display panel 110 to supply light to the display panel 110. The light supplied to the display panel 110 may pass through the display panel 110 and be emitted toward a top surface of the display panel 110.

The backlight unit 120 may be divided into an edge type backlight unit and a direct type backlight unit according to a method for arranging a luminescent lamp.

According to the edge type backlight unit, light is supplied by disposing a lamp as a light source on one side of the display panel 110. The edge-type backlight unit includes one or more light emitting devices installed on one side of a light guide plate, so that light generated by the lamp is guided along the light guide plate and is reflected upward.

The direct type backlight unit radiates light to the display panel 110 through a plurality of light emitting devices disposed below the display panel 110.

An optical path control member 130 that controls a path of light incident from the backlight unit 120 to the display panel 110 may be disposed between the display panel 110 and the backlight unit 120. For example, the optical path control member 130 may disperse the light emitted from the backlight unit 120 to the front of the display panel 110 or may control the directivity such that the light emitted from the backlight unit 120 has a directionality for a specific area of the display panel 110. For example, the specific area may be a central portion of the display panel, but the present disclosure is not limited thereto, the specific area may also be other areas near the central portion of the display panel.

The optical path control member 130 may include a first electrode 131, a second electrode 132 and a light conversion layer 133.

The first electrode 131 constitutes a bottom surface of the optical path control member 130.

For example, the first electrode 131 may be disposed to face the backlight unit 120. The first electrode 131 may be disposed on the backlight unit 120 in the form of a surface electrode or a patterned electrode.

The first electrode 131 may be made of a transparent conductive material. For example, the first electrode 131 may include indium tin oxide (ITO), indium zinc oxide (IZO), copper oxide, tin oxide, zinc oxide (ZnO), or titanium oxide, etc. In the embodiment, a light transmittance of the first electrode 131 may be about 80% or more. Then, the first electrode 131 is not visible to the outside, and the light transmittance is increased, so that the luminance of the display device 1 including the optical path control member 130 can be improved.

In another embodiment, the first electrode 131 may include various metals for implementing a low resistance. For example, the first electrode 131 may include at least one selected from chromium (Cr), nickel (Ni), copper (Cu), aluminum (Al), silver (Ag), molybdenum (Mo), gold (Au), titanium (Ti), and alloys thereof.

In another embodiment, the first electrode 131 may have a multilayer structure including a transparent conductive film and an opaque conductive film having high reflective efficiency. The transparent conductive film may be made of a material having a relatively high work function value such as indium tin oxide (ITO), indium zinc oxide (IZO), copper oxide, tin oxide, zinc oxide (ZnO), or titanium oxide, etc., and the opaque conductive film may have a single-layer or multi-layer structure including at least one selected from chromium (Cr), nickel (Ni), copper (Cu), aluminum (Al), silver (Ag), molybdenum (Mo), gold (Au), titanium (Ti), and alloys thereof. For example, the first electrode 131 may have a structure in which the transparent conductive film, the opaque conductive film, and the transparent conductive film are sequentially stacked, or a structure in which the transparent conductive film and the opaque conductive film are sequentially stacked, but the present disclosure is not limited thereto.

The second electrode 132 constitutes a top surface of the optical path control member 130. For example, the second electrode 132 may be disposed to face the display panel 110. The second electrode 132 may be disposed below the display panel 110 in the form of a surface electrode or a patterned electrode.

The second electrode 132 may be made of a transparent conductive material and may include various metals for implementing a low resistance. The second electrode 132 may be made of the same or similar or different material as the first electrode 131. For example, the second electrode 132 may include indium tin oxide (ITO), indium zinc oxide (IZO), copper oxide, tin oxide, zinc oxide (ZnO), or titanium oxide, etc. Alternatively, the second electrode 132 may include at least one selected from chromium (Cr), nickel (Ni), copper (Cu), aluminum (Al), silver (Ag), molybdenum (Mo), gold (Au), titanium (Ti), and alloys thereof. Alternatively, the second electrode 132 may have a multilayer structure including a transparent conductive film and an opaque conductive film having high reflective efficiency. The transparent conductive film may be made of a material having a relatively high work function value such as indium tin oxide (ITO), indium zinc oxide (IZO), copper oxide, tin oxide, zinc oxide (ZnO), or titanium oxide, etc., and the opaque conductive film may have a single-layer or multi-layer structure including at least one selected from chromium (Cr), nickel (Ni), copper (Cu), aluminum (Al), silver (Ag), molybdenum (Mo), gold (Au), titanium (Ti), and alloys thereof. For example, the second electrode 132 may have a structure in which the transparent conductive film, the opaque conductive film, and the transparent conductive film are sequentially stacked, or a structure in which the transparent conductive film and the opaque conductive film are sequentially stacked, but the present disclosure is not limited thereto.

The second electrode 132 is disposed to overlap at least a portion or the entire of the first electrode 131 or is disposed to be adjacent to the first electrode 131 at least. Accordingly, when a voltage is applied to the first electrode 131 and the second electrode 132, an electric field may be generated between them.

The light conversion layer 133 may be interposed between the first electrode 131 and the second electrode 132. The light conversion layer 133 may include a partition portion 31 and a receiving portion 32. Specifically, the light conversion layer 133 may include the receiving portion 32 partitioned into a plurality of regions by the partition portion 31. That is, the receiving portion 32 is a region divided by the partition portion 31, and an outer wall of the partition portion 31 constitutes an inner wall of the receiving portion 32.

Within the light conversion layer 133, the receiving portion 32 extends in a first direction X. Within the light conversion layer 133, the partition portion 31 and the receiving portion 32 may be alternately disposed in a second direction Y. Here, the partition portion 31 and the receiving portion 32 may have the same width or different widths in the second direction Y.

The partition portion 31 may be made of a transparent light-transmitting material. The partition portion 31 may be made of a conductive material. For example, the partition portion 31 may be made of a photocurable resin such as a ultraviolet (UV) resin or a photoresist resin, or may be made of a urethane resin, an acrylic resin, etc. The partition portion 31 may transmit incident light in an opposite direction to the light incident direction.

The receiving portion 32 and the partition portion 31 may have different refractive indices. For example, the receiving portion 32 may have a refractive index smaller than that of the partition portion 31. The receiving portion 32 may form an optical interface with the partition portion 31. Accordingly, light incident on the optical path control member 130 may be refracted at a predetermined angle at an interface between the receiving portion 32 and the partition portion 31.

The receiving portion 32 is formed in the form of a pyramid within the partition portion 31. That is, the receiving portion 32 is formed in the shape of a triangular pyramid with a width of an upper end thereof narrower than a width of a lower end thereof. However, the embodiment of the present disclosure is not limited thereto, and the receiving portion 32 may have a trapezoidal cross section of which the width of an upper end thereof is different from the width of a lower end thereof. That is, the receiving portion 32a may have a triangular pyramid shape as FIG. 2(a), or the receiving portion 32b may have a quadrangular pyramid shape as FIG. 2(b), but the embodiment of the present disclosure is not limited thereto.

When the receiving portion 32 has a triangular pyramid shape, each receiving portion 32 has a first sidewall a1 and a second sidewall a2. The first sidewall a1 is adjacent to one side of the optical path control member 130, and the second sidewall a2 is adjacent to the other side of the optical path control member 130.

The first sidewall a1 and the second sidewall a2 may form a predetermined angle with the first electrode 131. The first sidewall a1 and the second sidewall a2 may be formed to form the same angle as or different angles with the first electrode 131. When the first sidewall a1 and the second sidewall a2 form the same angle with the first electrode 131, the receiving portion 32 may have a symmetrical pyramid shape, and the cross section of the receiving portion 32 may be a regular triangle. When the first sidewall a1 and the second sidewall a2 form different angles with the first electrode 131, the receiving portion 32 has an asymmetrical pyramid shape, and the cross section of the receiving portion 32 may be a general triangle.

In the present embodiment, the receiving portion 32 may have a different pyramid shape according to the region of the optical path control member. For example, the receiving portion 32 may be formed in a symmetrical pyramid shape in a central portion of the optical path control member and may be formed in an asymmetrical pyramid shape in an edge portion of the optical path control member.

Here, the degree of asymmetry of the receiving portion 32 may gradually increase from a central portion to an edge portion of the display device 1. In other words, an inclination (degree of inclination) of the pyramid shape of the receiving portion 32 may gradually increase from the central portion to the edge portion of the display device 1.

That is, the closer to one side from the central portion of the optical path control member 130, the more the inclination of the first sidewall a1 adjacent to one side in each receiving portion 32 gradually increases, so that an angle formed by the first sidewall a1 and the first electrode 131 may decrease. Conversely, the closer to the other side from the central portion of the optical path control member 130, the more the inclination of the second sidewall a2 adjacent to the other side in each receiving portion 32 gradually increases, so that an angle formed by the second sidewall a2 and the first electrode 131 may decrease.

More specifically, referring to FIG. 3, the optical path control member 130 may include first to fifth regions A1, A2, A3, A4, and A5. The first to fifth regions A1, A2, A3, A4, and A5 are aligned from one side to the other side of the optical path control member 130. Here, the third region A3 may correspond to a central portion of the display panel 110, and the first region A1 and the fifth region A5 may correspond to an edge of the display panel 110.

In the third region A3, the receiving portion 32 may be formed in a symmetrical pyramid shape. In the receiving portion 32 of the third region A3, the first sidewall a1 and the second sidewall a2 may have the same inclination with respect to the first electrode 131. That is, in the third region A3, the angle formed by the first sidewall a1 of the receiving portion 32 and the first electrode 131 is the same as the angle formed by the second sidewall a2 and the first electrode 131 ($\theta$3).

In the first, second, fourth, and fifth regions A1, A2, A4, and A5, the receiving portion 32 may be formed in an asymmetrical pyramid shape.

An inclination of the first sidewall a1 of the receiving portion 32 in the second region A2 is greater than an inclination of the first sidewall a1 of the receiving portion 32 in the third region A3. That is, an angle $\theta$2 formed by the first sidewall a1 and the first electrode 131 in the second region A2 is smaller than the angle $\theta$3 formed by the first sidewall a1 and the first electrode 131 in the third region A3 ($\theta$2<$\theta$3). Accordingly, an inclination of the second sidewall a2 of the receiving portion 32 in the second region A2 is smaller than an inclination of the second sidewall a2 of the receiving portion 32 in the third region A3.

An inclination of the second sidewall a2 of the receiving portion 32 in the fourth region A4 is greater than the inclination of the second sidewall a2 of the receiving portion 32 in the third region A3. That is, an angle $\theta$4 formed by the second sidewall a2 and the first electrode 131 in the fourth region A4 is smaller than the angle $\theta$3 formed by the second sidewall a2 and the first electrode 131 in the third region A3 ($\theta$4<$\theta$3). Accordingly, the inclination of the first sidewall a1 of the receiving portion 32 in the fourth region A4 is smaller than the inclination of the first sidewall a1 of the receiving portion 32 in the third region A3.

In the present embodiment, the receiving portion 32 in the fourth region A4 may be mirrored on the receiving portion 32 in the second region A2. That is, the inclination of the first sidewall a1 of the second region A2 may correspond to an inclination of the second sidewall a2 of the fourth region A4, and the inclination of the second sidewall a2 of the second region A2 may correspond to the inclination of the first sidewall a1 of the fourth region A4.

An inclination of the first sidewall a1 of the receiving portion 32 in the first region A1 is greater than the inclination of the first sidewall a1 of the receiving portion 32 in the second region A2. That is, an angle θ1 formed by the first sidewall a1 and the first electrode 131 in the first region A1 is smaller than the angle θ2 formed by the first sidewall a1 and the first electrode 131 in the second region A2 (θ1<θ2). Accordingly, an inclination of the second sidewall a2 of the receiving portion 32 in the first region A1 is smaller than the inclination of the second sidewall a2 of the receiving portion 32 in the second region A2.

An inclination of the second sidewall a2 of the receiving portion 32 in the fifth region A5 is greater than the inclination of the second sidewall a2 of the receiving portion 32 in the fourth region A4. That is, an angle θ5 formed by the second sidewall a2 and the first electrode 131 in the fifth region A5 is smaller than the angle θ4 formed by the second sidewall a2 and the first electrode 131 in the fourth region A4 (θ5<θ4). Accordingly, the inclination of the first sidewall a1 of the receiving portion 32 in the fifth region A5 is smaller than the inclination of the first sidewall a1 of the receiving portion 32 in the fourth region A4.

In the present embodiment, the receiving portion 32 in the fifth region A5 may be mirrored on the receiving portion 32 in the first region A1. That is, the inclination of the first sidewall a1 of the first region A1 may correspond to an inclination of the second sidewall a2 of the fifth region A5, and the inclination of the second sidewall a2 of the first region A1 may correspond to the inclination of the first sidewall a1 of the fifth region A5.

The different shapes of the receiving portion 32 may control an optical path in different directions in each region of the optical path control member 130. For example, light incident on the central portion of the optical path control member 130 may be refracted at an interface between the symmetrical pyramid-shaped receiving portion 32 and the partition portion 31 and may be emitted in a direction generally perpendicular to the display panel 110. On the other hand, light incident on an edge of the optical path control member 130 may be refracted at an interface between the asymmetrical pyramid-shaped receiving portion 32 and the partition portion 31 and may be generally emitted toward the central portion of the display panel 110.

A travel path of the light passing through the optical path control member 130 will be described below in more detail with reference to the drawings.

As shown, the receiving portion 32 may be formed to come into direct contact with the first electrode 131 and the second electrode 132 within the light conversion layer 133. However, in another embodiment, the receiving portion 32 may be formed to be spaced apart from the first electrode 131 and/or the second electrode 132 by a predetermined distance, and the present disclosure is not limited thereto.

The receiving portion 32 is disposed such that at least one region of the receiving portion 32 overlaps with the first electrode 131. Also, the receiving portion 32 is disposed such that at least one region of the receiving portion 32 overlaps with the second electrode 132.

The receiving portion 32 may include a dispersion liquid 321 and scattered particles 322 dispersed within the dispersion liquid 321. That is, the dispersion liquid 321 may be filled in the receiving portion 32, and the scattered particles 322 may be dispersed within the dispersion liquid 321.

The dispersion liquid 321 is a solvent in which the scattered particles 322 are dispersed, and may be a transparent and low-viscosity insulating solvent. For example, the dispersion liquid 321 may include at least one of halocarbon oil, paraffin oil, and isopropyl alcohol, and the present disclosure is not limited thereto.

The scattered particle 322 may be a light scattering material or a light scattering particle that scatters at least a part of transmitted light incident from the backlight unit 120. The scattered particle 322 is an electrically driven particle, and may be, for example, transparent or white particles. The scattered particle 322 may include a metal oxide such as titanium oxide (TiO2), zirconium oxide (ZrO2), aluminum oxide (Al2O3), indium oxide (In2O3), zinc oxide (ZnO), or tin oxide (SnO2), etc., and is not limited thereto.

The scattered particle 322 may have a refractive index different from that of the dispersion liquid 321. The surfaces of the scattered particles 322 may form an optical interface with the dispersion liquid 321. Accordingly, the scattered particle 322 may scatter light in a random direction regardless of an incident direction of the incident light without substantially converting a peak wavelength of the incident light.

The receiving portion 32 may be electrically connected to the first electrode 131 and the second electrode 132, and the arrangement state of the scattered particles 322 charged with electricity may be controlled according to a voltage difference between the first electrode 131 and the second electrode 132. According to the arrangement state of the scattered particles 322, the light conversion layer 133 may implement a first mode and a second mode. In the embodiment, the first mode is a mode in which light incident in a scattering mode is scattered and emitted to the front of the upper display panel 110, and the second mode is a mode in which light incident in a directional mode is emitted to the central portion of the upper display panel 110.

Hereinafter, a viewing angle control method of the display device 1 according to the first mode and the second mode of the light conversion layer 133 will be described in detail.

Figure 4:
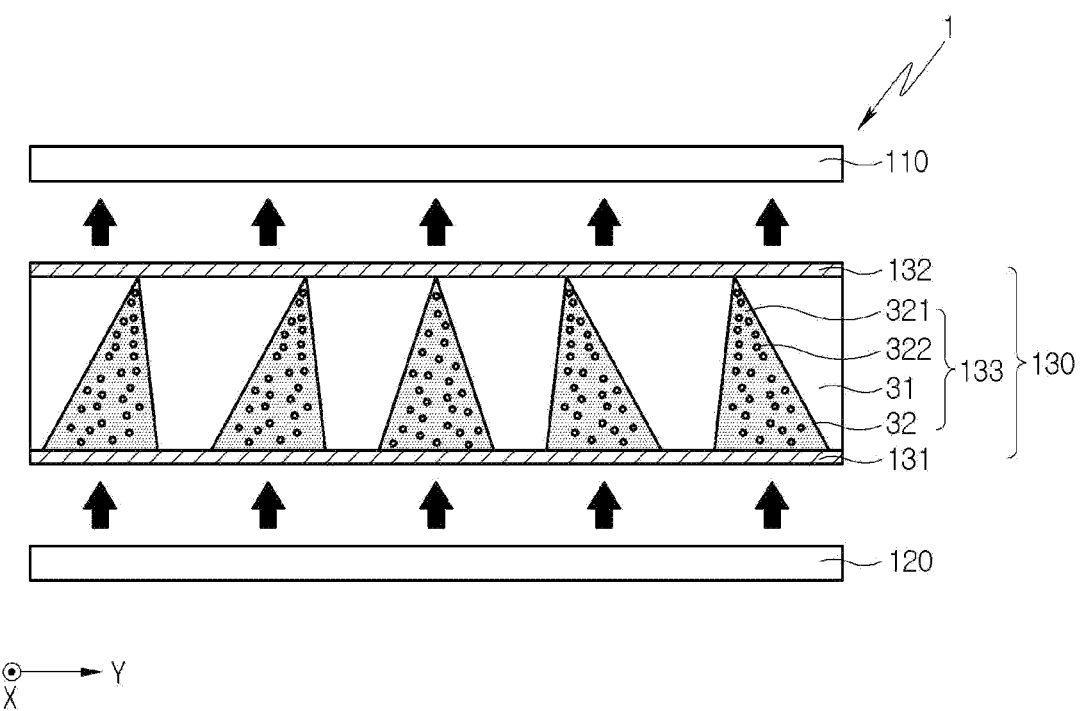
FIG. 4 is a cross-sectional view of the display device in a first mode according to an embodiment of the present disclosure.
Figure 5:
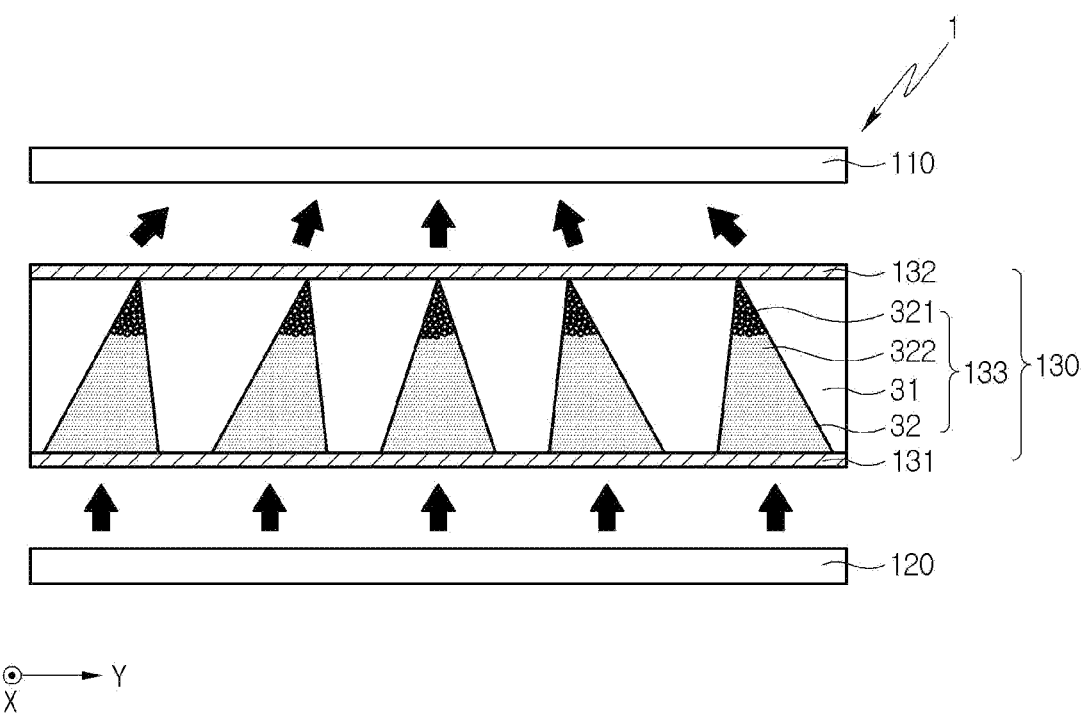
FIG. 5 is a cross-sectional view of the display device in a second mode according to an embodiment of the present disclosure.

FIG. 4 is a cross-sectional view of the display device in the first mode according to an exemplary embodiment of the present disclosure. FIG. 5 is a cross-sectional view of the display device in the second mode according to an exemplary embodiment of the present disclosure.

Referring to FIGS. 1 and 2 together, when a voltage is applied to the first electrode 131 and the second electrode 132, the scattered particles 322 are, as shown in FIG. 4, uniformly dispersed within the dispersion liquid 321, so that the first mode in which external light is scattered to the front of the display panel 110 is implemented. Here, since the external light applied to the partition portion 31 and the receiving portion 32 can pass through the light conversion layer 30, the external light is visible from the front of the display device 1.

The scattered light and the light passing through the partition portion 31 are emitted to the front of the display panel 110. That is, the display device 1 may implement a scattering mode in which a viewing angle is opened to the front.

When a voltage is applied to at least one of the first electrode 131 and the second electrode 132, the scattering particle 322 may move, as shown in FIG. 5, toward the first electrode 131 or the second electrode 132 by the electric field. Here, the moving direction of the scattered particle 322 may be controlled according to a polarity (cathode or anode) of the scattered particle 322 and the relative magnitudes of the voltages applied to the first electrode 131 and the second electrode 132. In a preferred embodiment, the scattered particle 322 may move in the direction of the second electrode 132, that is to say, near a vertex of the pyramid-shaped receiving portion 32, but the present disclosure is not limited thereto.

When the scattered particles 322 are aggregated around the first electrode 131 or the second electrode 132, external light may be transmitted through the partition portion 31 and the receiving portion 32. The transmitted light is refracted at the interface between the receiving portion 32 and the partition portion 31. Here, by the symmetrical and asymmetrical pyramid shapes of the receiving portion 32, the second mode in which light is emitted toward the central portion of the display panel 110 is implemented. That is, the display device 1 may implement a directional mode in which the viewing angle is opened to a specific area of the display panel 110, for example, the central portion and is partially limited around the edge.

Hereinafter, optical paths in the first mode and the second mode will be described in detail.

Figure 6:
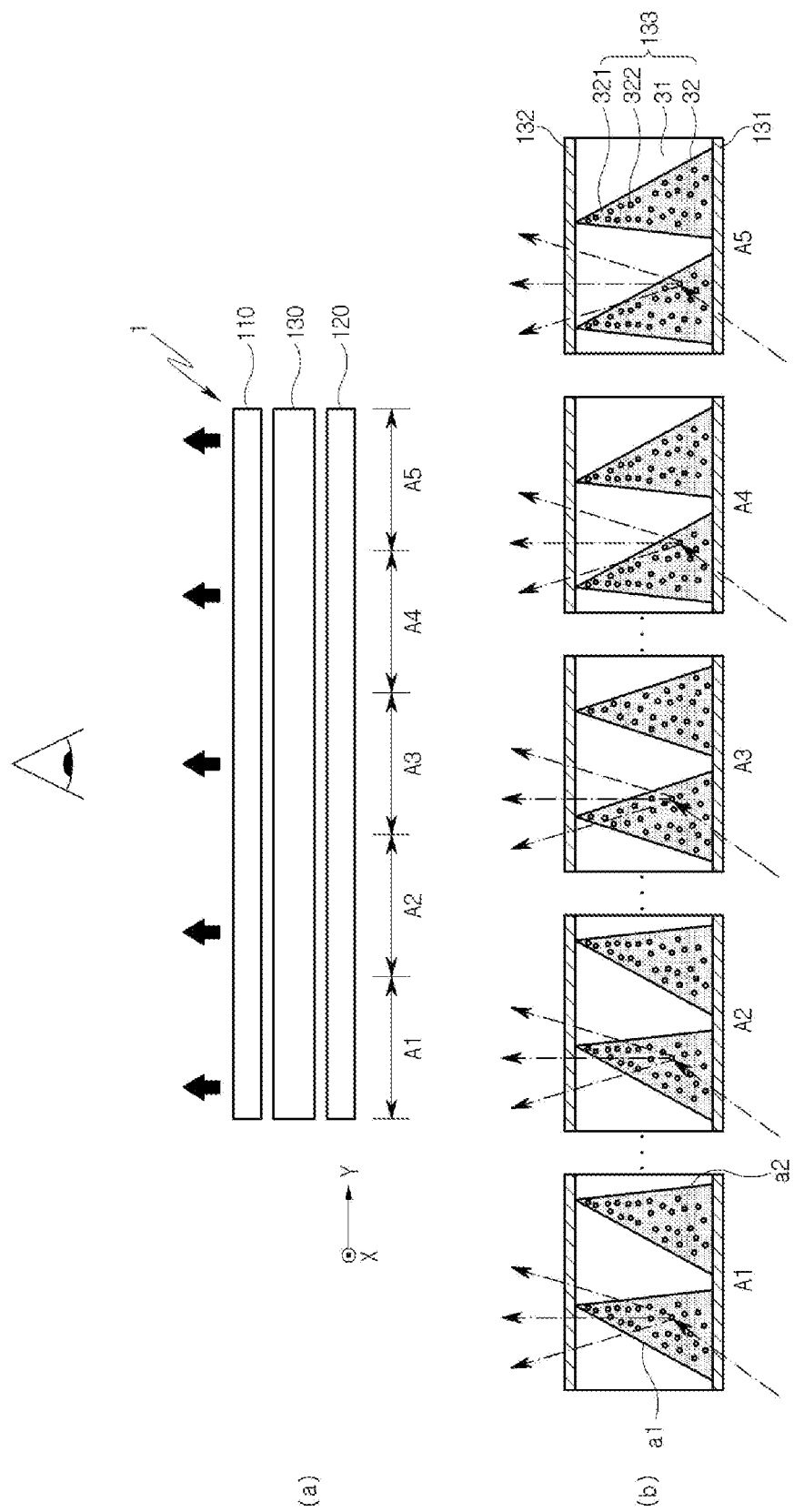
FIG. 6 is a cross-sectional view showing a light travel path of each region in the first mode of the display device according to an embodiment of the present disclosure.

FIG. 6 is a cross-sectional view showing a light travel path of each region in the first mode of the display device according to an exemplary embodiment of the present disclosure.

A part of light which is emitted upward from the backlight unit 120 and is incident on the optical path control member 130 passes through the partition portion 31 and reaches the display panel 110, and the other part of the light reaches, as shown, the receiving portion.

Referring to (b) of FIG. 6, in the first mode, the scattered particles 322 are uniformly dispersed within the dispersion liquid 321. Accordingly, the light incident on the receiving portion 32 may be scattered by the scattered particles 322 and emitted upward.

As shown in (a) of FIG. 6, the scattering of the emitted light occurs the same in all the regions. Accordingly, a user can view images displayed on the display panel 110 in all areas of the display panel 110.

Here, in each region (central portion and edge portion), the light is emitted to the front perpendicular to the corresponding region, and a lateral emission angle of the corresponding region may be limited to a certain level or less. That is, when the display panel 110 has a large area, images displayed on both left and right ends of the display panel 110 may not be visible to a user located in the center of the display panel 110. Similarly, a user located on one side edge of the display panel 110 may not view images displayed on the other side edge of the display panel 110.

Figure 7:
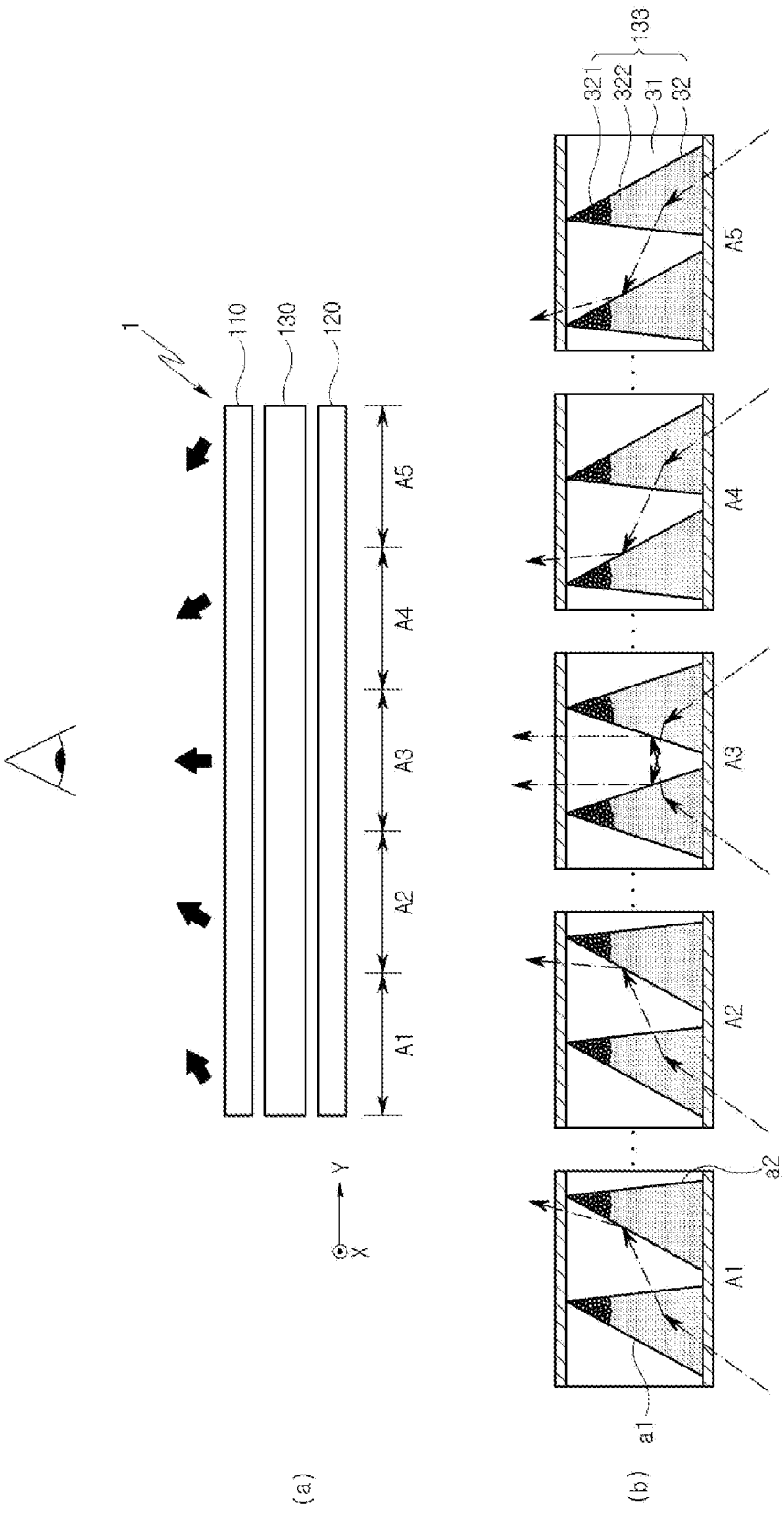
FIG. 7 is a cross-sectional view showing a light travel path of each region in the second mode of the display device according to an embodiment of the present disclosure.

FIG. 7 is a cross-sectional view showing a light travel path of each region in the second mode of the display device according to an exemplary embodiment of the present disclosure.

A part of the light which is emitted upward from the backlight unit 120 and is incident on the optical path control member 130 passes through the partition portion 31 and reaches the display panel 110, and the other part of the light reaches, as shown, the receiving portion.

In the second mode, the scattered particles 322 are aggregated around the first electrode 131 or the second electrode 132. In the shown embodiment, the scattered particles 322 are aggregated around the second electrode 132. Accordingly, the optical path of the light incident on the receiving portion 32 is not significantly obstructed by the scattered particles 322. The light incident on the receiving portion 32 may be refracted at the interface between the receiving portion 32 and the partition portion 31 and emitted.

The direction of refraction of the light may be controlled according to the interface between the receiving portion 32 and the partition portion 31, that is, the inclination of the sidewall of the receiving portion 32. Referring to FIG. 7, the receiving portion 32 has a symmetrical pyramid shape in the third region A3 of the display device 1, that is, in the central portion. Light obliquely incident on the receiving portion 32 is refracted at the interface between the receiving portion 32 and the partition portion 31 and is incident into the partition portion 31 having a high refractive index. Since the refractive index of the partition portion 31 is greater than the refractive index of the receiving portion 32, the light incident into the partition portion 31 may be totally reflected at the interface between the partition portion 31 and the receiving portion 32 and may be emitted toward the display panel 110. Here, the light is emitted generally perpendicular to the front of the display panel 110 in correspondence to the inclination of the first and second sidewalls a1 and a2 of the symmetrical pyramid-shaped receiving portion 32.

In the second region A2 of the display device 1, that is, in a surrounding region adjacent to the central portion, the receiving portion 32 has an asymmetrical pyramid shape. Light obliquely incident on the receiving portion 32 is refracted at the interface between the receiving portion 32 and the partition portion 31 and is incident into the partition portion 31 having a high refractive index. Since the refractive index of the partition portion 31 is greater than the refractive index of the receiving portion 32, the light incident into the partition portion 31 may be totally reflected at the interface between the partition portion 31 and the receiving portion 32 and may be emitted toward the display panel 110. Here, the light is emitted obliquely in the lateral direction due to the relatively large inclination of the first sidewall a1 of the asymmetrical pyramid-shaped receiving portion 32. That is, the light may be emitted toward the central portion of the display panel 110.

The thus emitted light may be emitted toward the front of the central portion of the display device 1 through the display panel 110. That is, in the second region A2, the viewing angle is opened to the central portion of the display device 1. A user who watches the display device 1 from the front of the central portion of the display device 1 can view images displayed on the second region A2.

Even in the fourth region A4 where the receiving portion 32 mirrored on the receiving portion 32 in the second region A2 is disposed, light is emitted in a similar manner. That is, in the fourth region A4, the light is emitted obliquely in the lateral direction due to the relatively large inclination of the second sidewall a2 of the asymmetrical pyramid-shaped receiving portion 32. That is, the light may be emitted toward the central portion of the display panel 110.

Accordingly, in the fourth region A4, the viewing angle is opened to the central portion of the display device 1. A user who watches the display device 1 from the front of the central portion of the display device 1 can view images displayed on the fourth region A4.

In the first region A1 of the display device 1, that is, in the edge portion, the receiving portion 32 has an asymmetrical pyramid shape. The degree of asymmetry of the receiving portion 32 in the first region A1 is greater than the degree of asymmetry of the receiving portion 32 in the second region A2.

Light obliquely incident on the receiving portion 32 of the first region A1 is refracted at the interface between the receiving portion 32 and the partition portion 31 and is incident into the partition portion 31 having a high refractive index. Since the refractive index of the partition portion 31 is greater than the refractive index of the receiving portion 32, the light incident into the partition portion 31 may be totally reflected at the interface between the partition portion 31 and the receiving portion 32 and may be emitted toward the display panel 110. Here, the light is emitted more obliquely in the lateral direction due to the larger inclination of the first sidewall a1 of the asymmetrical pyramid-shaped receiving portion 32. That is, the light may be emitted toward the central portion of the display panel 110.

The thus emitted light may be emitted toward the front of the central portion of the display device 1 through the display panel 110. That is, in the first region A1, the viewing angle is opened to the central portion of the display device 1. A user who watches the display device 1 from the front of the central portion of the display device 1 can view images displayed on the first region A1.

Even in the fifth region A5 where the receiving portion 32 mirrored on the receiving portion 32 in the first region A1 is disposed, light is emitted in a similar manner. That is, in the fifth region A5, the light is emitted more obliquely in the lateral direction due to the relatively large inclination of the second sidewall a2 of the asymmetrical pyramid-shaped receiving portion 32. That is, the light may be emitted toward the central portion of the display panel 110.

Accordingly, in the fifth region A5, the viewing angle is opened to the central portion of the display device 1. A user who watches the display device 1 from the front of the central portion of the display device 1 can view images displayed on the fifth region A5.

As described above, in the second mode, the display device 1 operates in the directional mode in which light is emitted toward the central portion with directionality in all regions. Accordingly, a viewer watching the display device 1 from the front of the central portion of the display device 1 can view images displayed in the entire area including the edge of the display device 1 without limiting the viewing angle.

As described above, the display device 1 according to the above embodiments can support directional light emission for a viewer located in the center of the screen by using the optical path control member 130 without physically curving the display panel 110. That is, the viewer located in the center of the screen can conveniently view images displayed on the entire screen. Therefore, according to the embodiments, the display device 1 is a flat panel display device and provides the same effect as that of a curved display device. Also, the display device 1 according to embodiments of the present disclosure prevents or at least reduces the deterioration of environmental reliability and damage of the display panel due to the curving of the display panel. In addition, a viewer located in the center of the screen can be provided with images having sufficiently improved luminance through the directional light emission, so that unnecessary power consumption can be prevented or at least reduced.

In figures of the present disclosure, a case that the optical path control member 130 is divided into five regions and each region has one or two receiving portions 32 is shown, but embodiments of the present disclosure are not limited thereto. The optical path control member 130 according to the embodiments of the present disclosure may be divided into three or more regions and each region has one or more receiving portion 32. For example, the optical path control member 130 may be divided into seven regions and each region has two receiving portion 32. Alternatively, the optical path control member 130 may be divided into nine regions and each region has three receiving portion 32.

The display device according to the embodiments of the present disclosure can support the directional light emission for a viewer located in the center of the screen without curving the display panel, thereby providing the same effect as that of a curved display device.

The display device according to the embodiments of the present disclosure provides the same effect as that of the curved display device by using a flat panel display panel, thereby preventing the deterioration of environmental reliability and damage of the display panel due to the curving of the display panel.

The display device according to the embodiments of the present disclosure can solve the power consumption problem of the curved display device and enhance the luminance.

It can be understood by those skilled in the art that the embodiments can be embodied in other specific forms without departing from its spirit or essential characteristics. Therefore, the foregoing embodiments and advantages are merely exemplary and are not to be construed as limiting the present invention. It can be understood by those skilled in the art that the embodiments can be embodied in other specific forms without departing from its spirit or essential characteristics. Therefore, the foregoing embodiments and advantages are merely exemplary and are not to be construed as limiting the present invention. The scopes of the embodiments are described by the scopes of the following claims rather than by the foregoing description. All modifications, alternatives, and variations derived from the scope and the meaning of the scope of the claims and equivalents of the claims should be construed as being included in the scopes of the embodiments.

What is claimed is:

1. A display device comprising:
   a display panel configured to display an image;
   a backlight unit below the display panel, the backlight unit configured to emit light; and
   an optical path control member between the display panel and the backlight unit;
   wherein the optical path control member includes:
   a first electrode,
   a second electrode, and
   a light conversion layer between the first electrode and the second electrode,
   wherein the light conversion layer comprises:
   a partition portion; and
   a plurality of receiving portions having a pyramid shape within the partition portion, wherein scattered particles are dispersed in the plurality of receiving portions,
   wherein at least one of the plurality of receiving portions has a symmetrical pyramid shape in a central portion of the optical path control member and at least one of the plurality of receiving portions has an asymmetrical pyramid shape in an edge portion of the optical path control member.

2. The display device of claim 1, the receiving portions are formed in a triangular pyramid shape within the partition portion.

3. The display device of claim 1,
   wherein the optical path control member comprises three or more regions aligned from one side to another side of the optical path control member, each region having at least one receiving portion, and
   wherein the receiving portion of a first region are mirrored on the receiving portion of a last region.

4. The display device of claim 1, wherein a degree of asymmetry of a receiving portion from the plurality of receiving portions gradually increases from the central portion to the edge portion.

5. The display device of claim 4,
wherein, in a first mode, a voltage is not applied to the first electrode and the second electrode, and the scattered particles are dispersed within the plurality of receiving portions, and
wherein the light generated by the backlight unit is scattered by the scattered particles and is emitted to a front of the display panel.

6. The display device of claim 4,
wherein, in a second mode, a voltage is applied to the first electrode and the second electrode, and the scattered particles are aggregated around the first electrode or the second electrode, and
wherein the light generated by the backlight unit is refracted at an interface between the plurality of receiving portions and the partition portion and is emitted toward a central portion of the display panel.

7. The display device of claim 1, wherein the plurality of receiving portions have a refractive index smaller than a refractive index of the partition portion.

8. The display device of claim 1, wherein each of the plurality of receiving portions comprises:
a first sidewall which is adjacent to a first side of the optical path control member; and
a second sidewall which is adjacent to a second side of the optical path control member.

9. The display device of claim 8,
wherein inclinations of first sidewalls of the plurality of receiving portions gradually increase from the first side to the second side, and
wherein inclinations of second sidewalls of the plurality of receiving portions gradually increase from the second side to the first side.

10. The display device of claim 8,
wherein the optical path control member comprises a plurality of regions aligned from the first side to the second side, the plurality of regions including a first region, a second region, a third region, a fourth region, and a fifth region, and
wherein angles formed by the first sidewall and the second sidewall and the first electrode are different in each of the plurality of regions, and
wherein angles formed by the second sidewall and the first electrode are different in the first to fifth regions.

11. The display device of claim 10, wherein, in the third region, an angle formed by the first sidewall of the plurality of receiving portions and the first electrode is a same as an angle formed by the second sidewall and the first electrode.

12. The display device of claim 11, wherein an angle formed by the first sidewall of the plurality of receiving portions and the first electrode in the second region is smaller than an angle formed by the first sidewall of the plurality of receiving portions and the first electrode in the third region.

13. The display device of claim 10, wherein an angle formed by the first sidewall of the plurality of receiving portions and the first electrode in the first region is smaller than an angle formed by the first sidewall of the plurality of receiving portions and the first electrode in the second region.

14. The display device of claim 12, wherein an angle formed by the second sidewall of the plurality of receiving portions and the first electrode in the fourth region is smaller than an angle formed by the second sidewall of the plurality of receiving portions and the first electrode in the third region.

15. The display device of claim 14, wherein an angle formed by the second sidewall of the plurality of receiving portions and the first electrode in the fifth region is smaller than an angle formed by the second sidewall and the first electrode in the fourth region.

16. The display device of claim 10,
wherein the plurality of receiving portions in the second region are mirrored on the plurality of receiving portions in the fourth region,
wherein the plurality of receiving portions of the first region are mirrored on the plurality of receiving portions of the fifth region.

17. A display device comprising:
a display panel configured to display an image;
a backlight unit below the display panel, the backlight unit configured to emit light; and
an optical path control member between the display panel and the backlight unit, the optical path control member configured to control a path of light generated by the backlight unit,
wherein the optical path control member is configured to emit the light generated by the backlight unit to a front of the display panel in a first mode, and emit the light generated by the backlight unit to a specific area of the display panel in a second mode,
wherein the optical path control member comprises:
a first electrode on the backlight unit;
a second electrode below the display panel; and
a light conversion layer between the first electrode and the second electrode, wherein the light conversion layer includes a plurality of receiving portions formed within a partition portion in a pyramid shape,
wherein the receiving portions are formed in a symmetrical pyramid shape in a central portion of the light conversion layer and are formed in an asymmetrical pyramid shape in an edge portion of the light conversion layer.

18. The display device of claim 17, wherein the specific area is a central portion of the display panel.

19. The display device of claim 17, the receiving portions are formed in a triangular pyramid shape within the partition portion.

20. The display device of claim 17,
wherein light conversion layer comprises three or more regions aligned from one side to another side of the light conversion layer, each region having at least one receiving portion, and
wherein the receiving portion of a first region are mirrored on the receiving portion of a last region.

21. The display device of claim 17, wherein each of the plurality of receiving portions comprises:
a dispersion liquid; and
scattered particles dispersed in the dispersion liquid and scatter incident light.

22. The display device of claim 21, wherein inclinations of pyramid shapes of the plurality of receiving portions gradually increase from a central portion to an edge portion of the optical path control member.

23. The display device of claim 22, wherein an inclination of another side wall of the pyramid shaped receiving portion gradually decreases from the central portion to the edge portion of the optical path control member.

* * * * *